United States Patent
Khellaf et al.

(10) Patent No.: US 7,137,805 B2
(45) Date of Patent: Nov. 21, 2006

(54) GNOCCHI MAESTRO

(75) Inventors: Hamid Khellaf, 2 Adams St. #206, Denver, CO (US) 80206; Momo Attaoui, Brooklyn, NY (US)

(73) Assignee: Hamid Khellaf, Denver, CO (US)

( * ) Notice: Subject to any disclaimer, the term of this patent is extended or adjusted under 35 U.S.C. 154(b) by 0 days.

(21) Appl. No.: 10/900,443

(22) Filed: Dec. 13, 2004

(65) Prior Publication Data

US 2006/0127524 A1 Jun. 15, 2006

(51) Int. Cl.
*A01J 21/00* (2006.01)
(52) U.S. Cl. .................. 425/458; 425/291; 7/110; 492/13; 492/14
(58) Field of Classification Search ............. 425/298, 425/290, 291, 318, 458; 492/14; 7/110–113; 99/348
See application file for complete search history.

(56) References Cited

U.S. PATENT DOCUMENTS 2,048,750 A * 7/1936 Adolf ................. 241/273.1
D495,218 S * 8/2004 Yu ........................ D7/673

* cited by examiner

*Primary Examiner*—Joseph S. Del Sole
*Assistant Examiner*—Maria Veronica Ewald
(74) *Attorney, Agent, or Firm*—Hamid Khellaf; Momo Attaoui

(57) ABSTRACT

A gnocchi tool maker that comprised of a paddle and two elliptical shape handles that rotate around the paddle allowing the gnocchi maker to use either the engraved "V" or, and "U" grooves of the paddle.

1 Claim, 9 Drawing Sheets

RIGHT OR LEFT SIDE ELEVATION WITH HANDLE AT UPPER POSITION

FIG. 2 FRONT ELEVATION WITH HANDLE AT UPPER POSITION

FIG. 3 BACK ELEVATION

FIG. 4 BACK ELEVATION WITH HANDLE AT UPPER POSITION

FIG. 5 RIGHT OR LEFT SIDE ELEVATION WITH HANDLE AT UPPER POSITION

FIG. 7 RIGHT OR LEFT SIDE ELEVATION WITOUT HANDLE

FIG. 8 TOP OR BOTTOM SIDE ELEVATION WITH HANDLE AT UPPER POSITION

FIG. 9 TOP OR BOTTOM SIDE ELEVATION WITH HANDLE POSITION AT ZERO DEGREE ANGLE

GNOCCHI MAESTRO

BACKGROUND OF THE INVENTION

Chefs, home cooks and pasta makers of all kinds will be dancing in the streets, thanks to a new way to make one of the world's favorite Italian foods: handmade gnocchi. The Gnocchi Maestro is a simple kitchen tool that revolutionizes the classic Italian dumpling method.

Anyone who has watched an intimidating demonstration of the old way of making gnocchi knows that it's a laborious step-by-step process. With the old process, each bite-size morsel was painstakingly crafted with rolling pin, finger and fork. The grooved surfaces and sturdy handles of the Gnocchi Maestro enable cooks to make numerous gnocchi with just one pass of the paddle over any recipe of gnocchi dough.

The key to its magic is simple: it expands the effect of both the times of a fork and the grooves of the antique device used by some Italian cooks, by multiplying their surface area by more than four times. Roll, shape and decorate six or eight gnocchi an entire portion, in the time it takes to create one piece the old-fashioned way. Choose either the fine decorative lines of the paddle front of the device (V shape grooves), or the rustic fork effect of the paddle back (U shape grooves), For extra ease, there's yet another method of quick gnocchi production open to users of the Gnocchi Maestro. Pressed gnocchi skips the usual step of rolling the dough into logs. By simply pressing the dough onto a work surface with the Gnocchi Maestro, the cook creates a decorated, perfectly even template that can be cut into four, six or eight gnocchi in seconds.

The Gnocchi Maestro solves a major problem for home cooks who have shied away form serving delicious comforting gnocchi as a dinner course for guests because of the labor factor. With the Gnocchi Maestro, dinner for 8 can be ready in 50 minutes, from dough to garnished plates. Home cooks can savor a once time-consuming rarity anytime they wish, now that gnocchi can become part of their everyday menus. Tender potato gnocchi, resilient semolina gnocchi of Southern Italy, stunning, fragrant basil gnocchi and even luscious, savory crab gnocchi in vegetable cream sauce are just a few of the exquisite dishes that become quick and easy for the owner of a Gnocchi Maestro. And the Gnocchi Maestro is so beautiful that it becomes a decorative addition to the kitchen in itself. Professional chefs also save valuable labor time using the Gnocchi Maestro. Its artistic look draws on colors and shapes from the natural environment. Its colors will last through the years, washing perfectly clean both by hand and in the dishwasher, due to the Gnocchi Maestro's durable, hard polypropylene construction. The Gnocchi Maestro opens up new possibilities for cooks of every level.

SUMMARY OF THE INVENTION

The Gnocchi Maestro is gnocchi tool maker invented to improve and facilitate the make of the gnocchi. It is a paddle and two elliptical shape handles. The paddle front is engraved with fine decorative or "V" shape grooves and paddle back engraved with fork effect or "U" shape grooves. The handle is attached to the paddle through two drilled through openings.

DETAILED DESCRIPTION OF THE INVENTION

Figure 1:
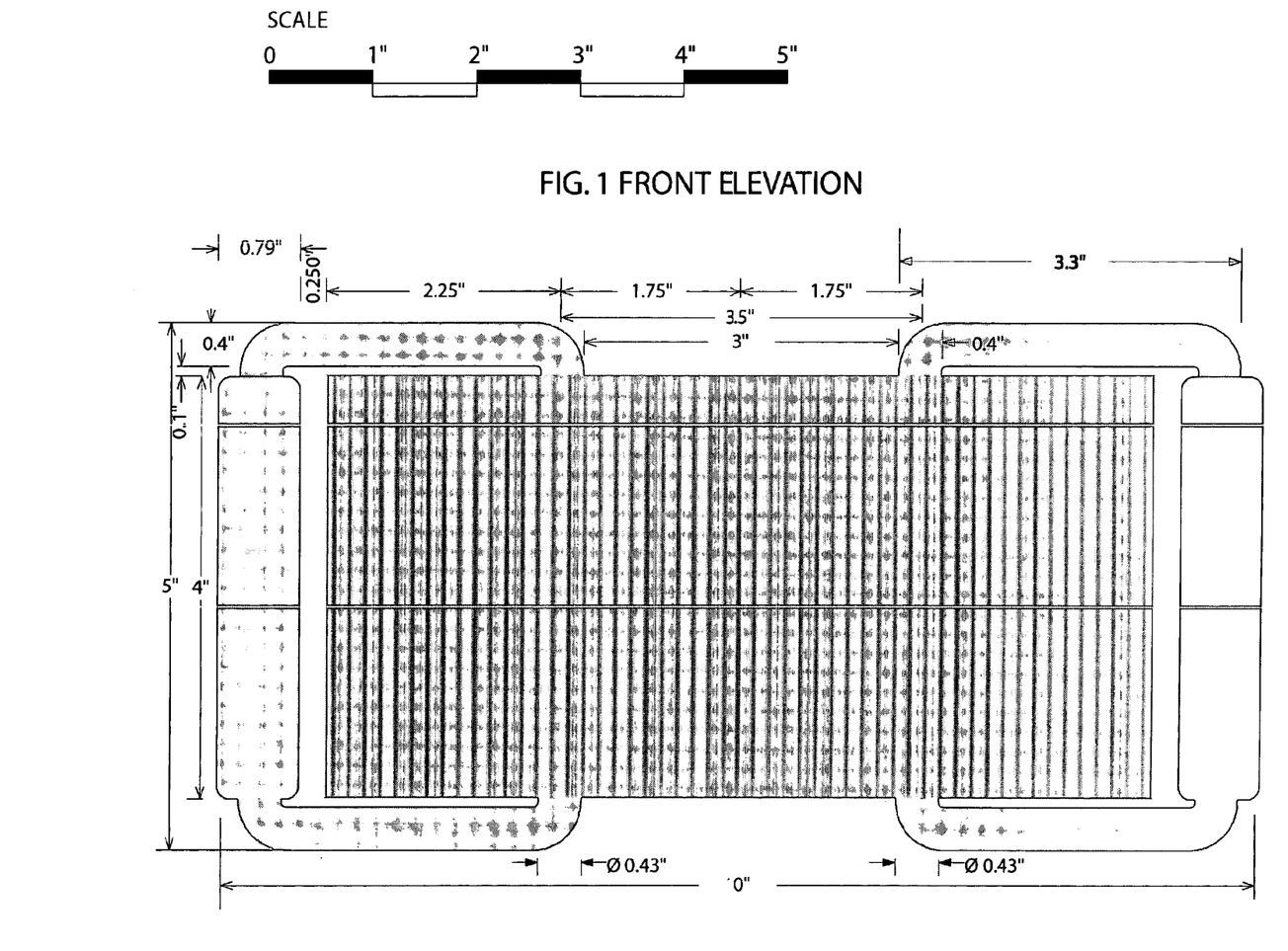
FIG. 1 is the front elevation of the present invention
Figure 2:
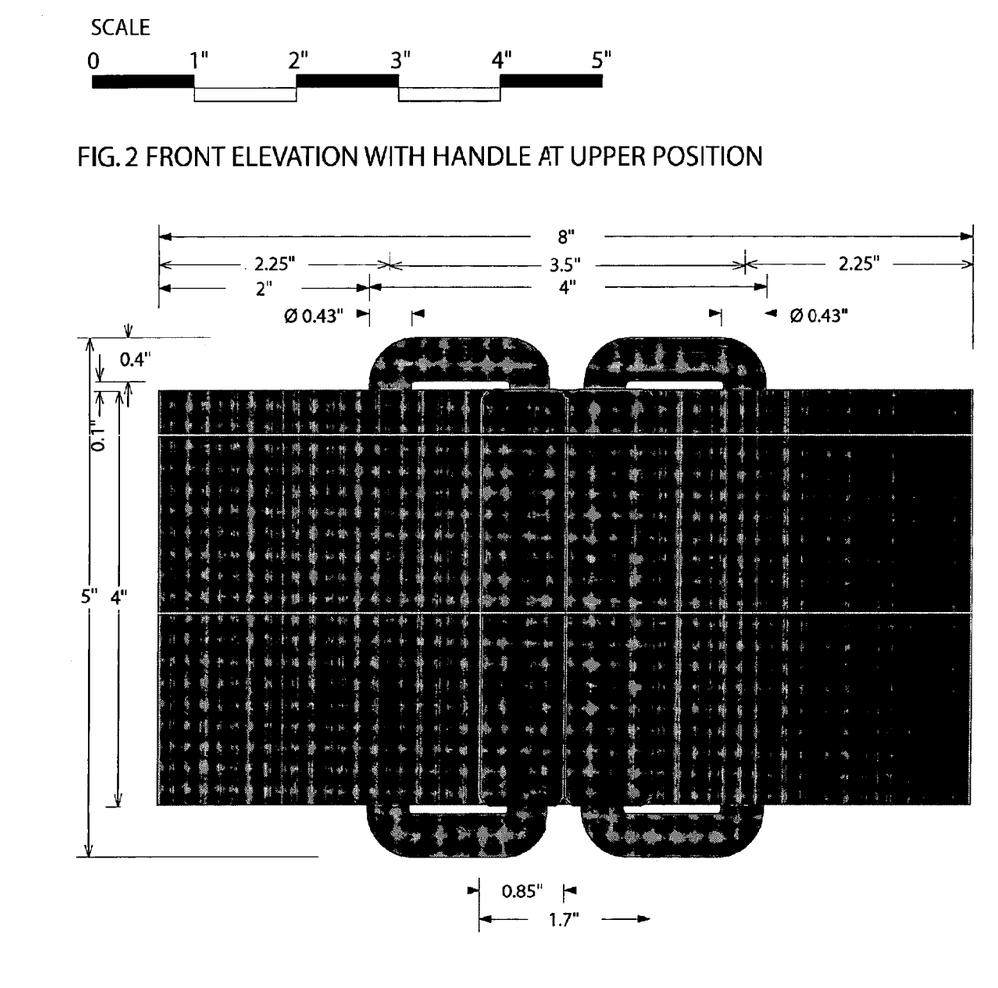
FIG. 2 is the front elevation with a handle at upper position of the present invention
Figure 3:
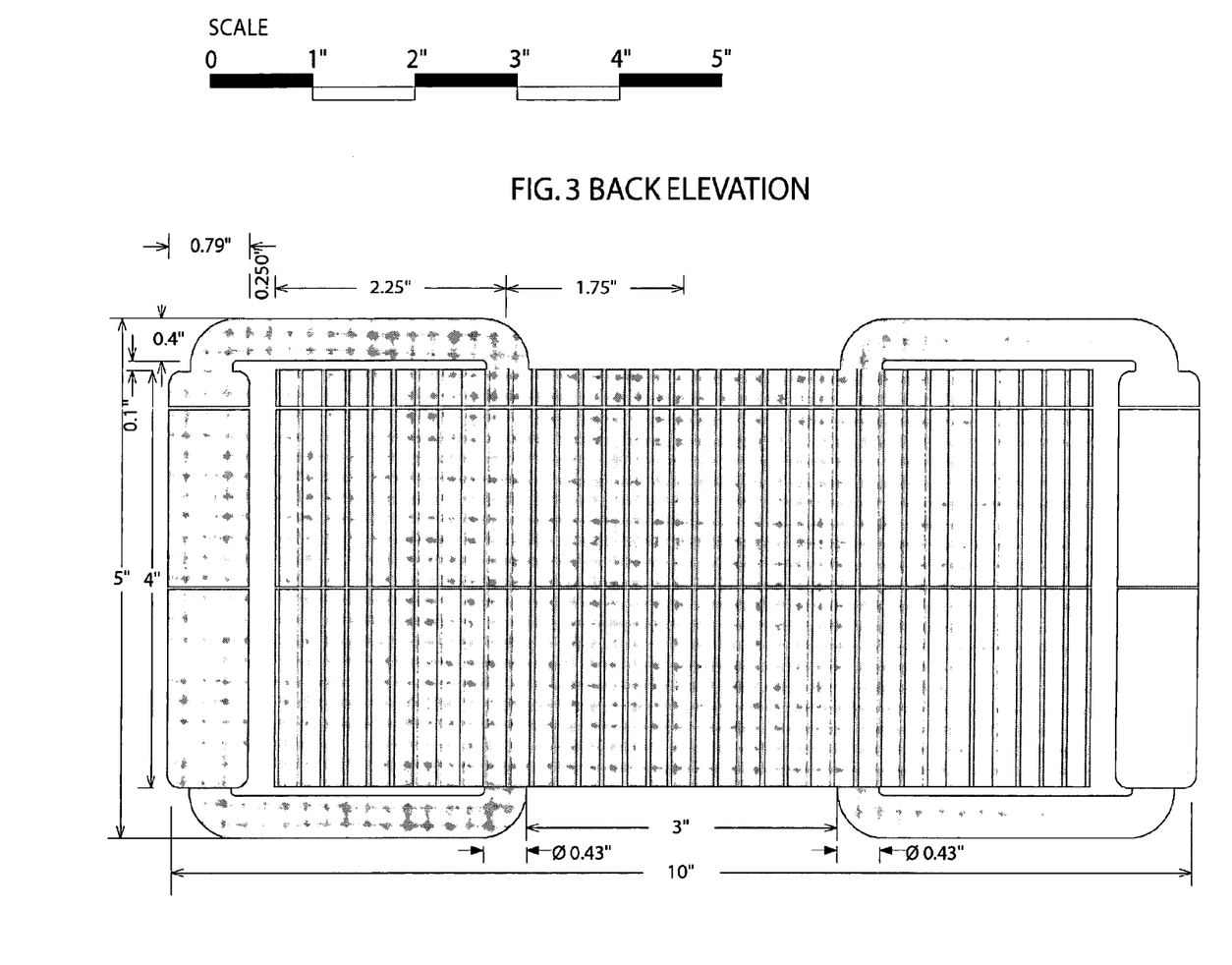
FIG. 3 is the back elevation of the present invention
Figure 4:
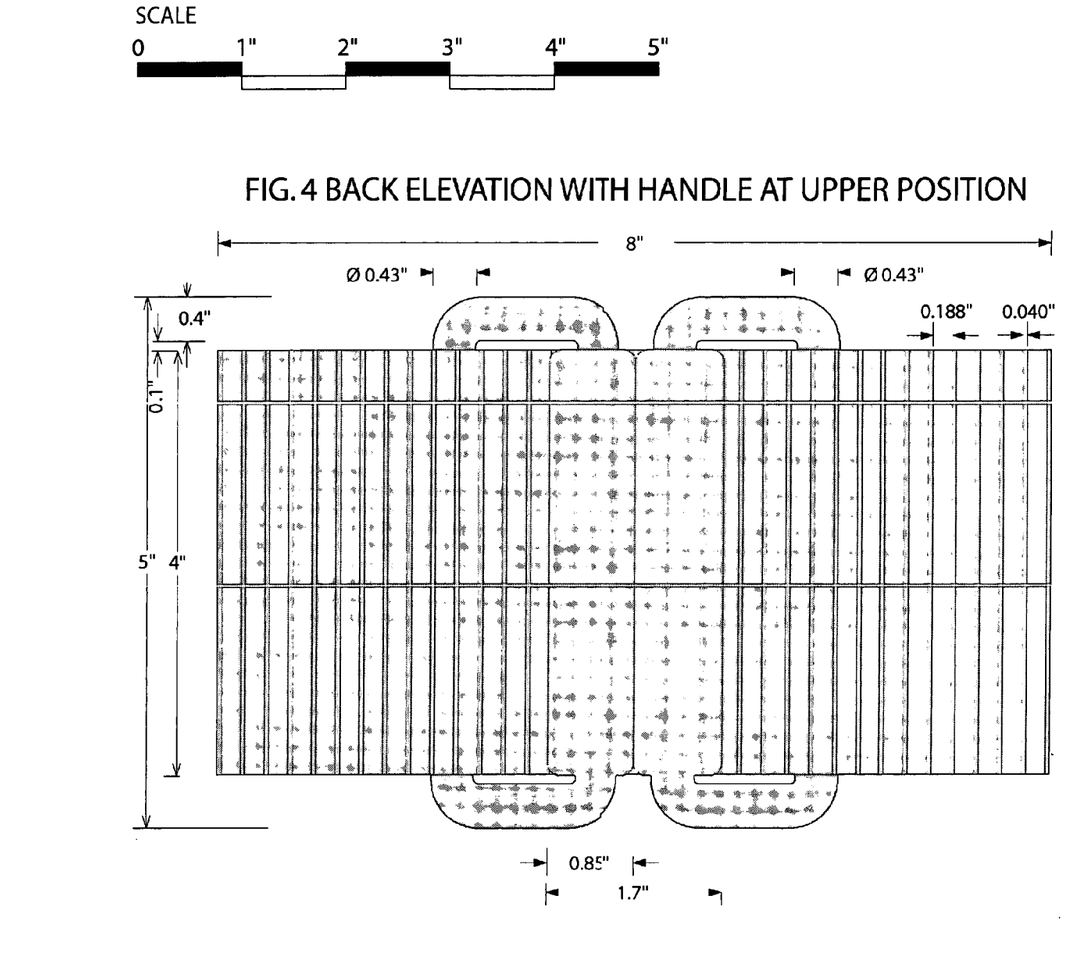
FIG. 4 is the back elevation with handle at upper position
Figure 5:
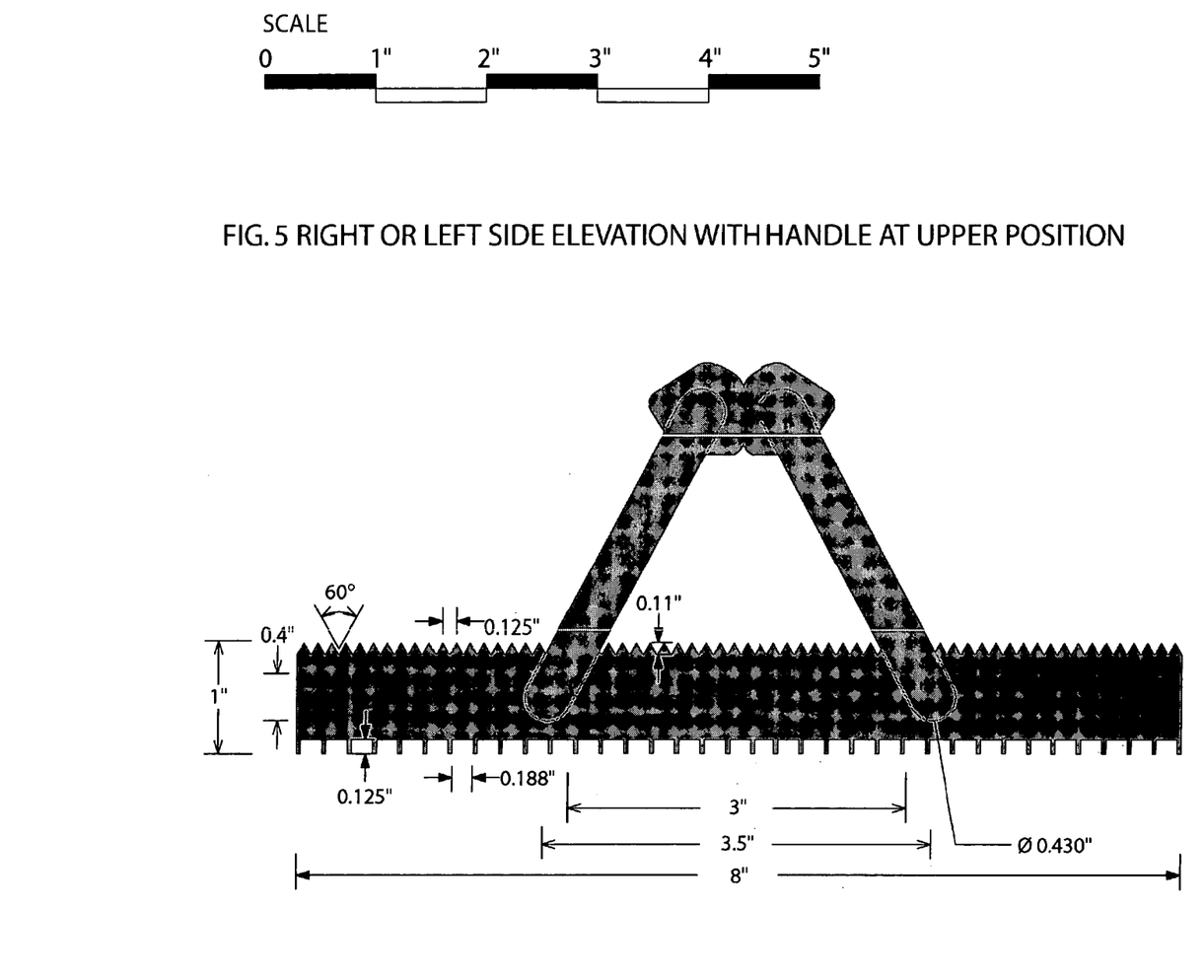
FIG. 5 is the right side elevation of the present invention
Figures 6A, 6B:
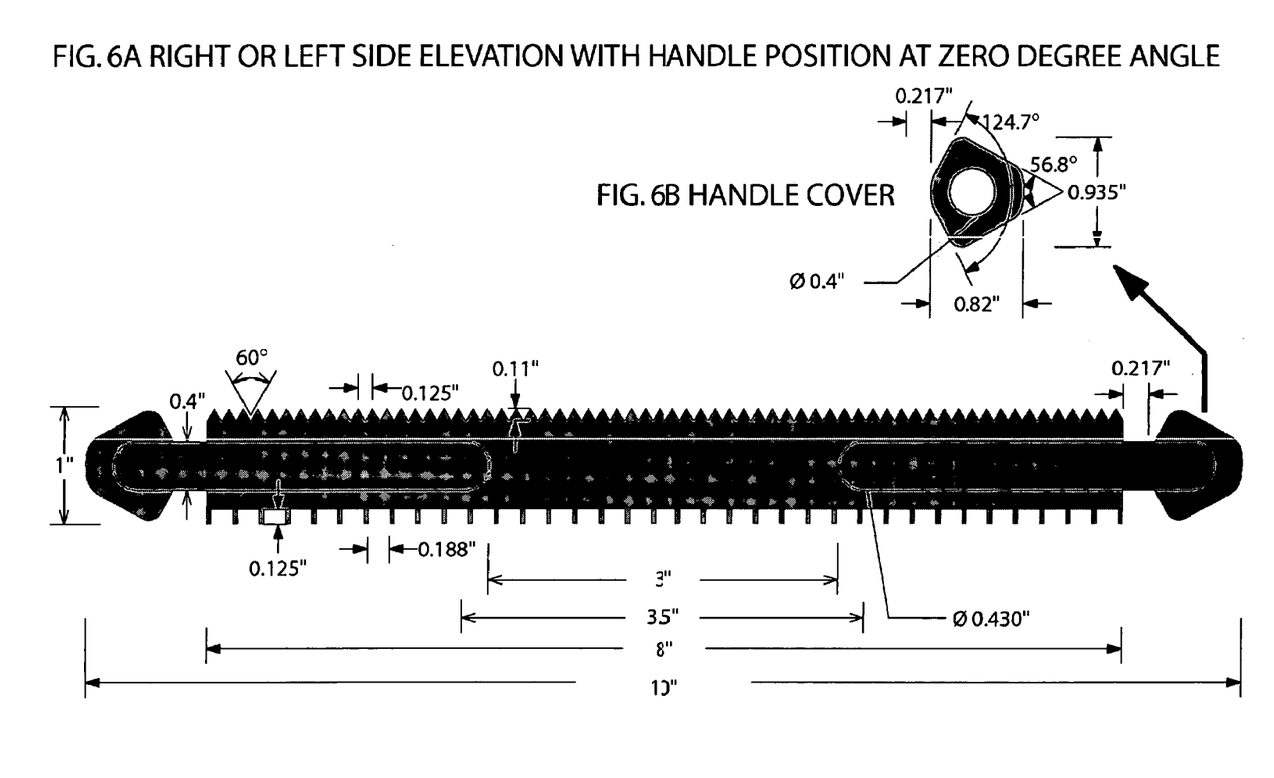
FIG. 6A is the right side elevation with handle positioned at zero degree
FIG. 6B is the handle cover
Figure 7:
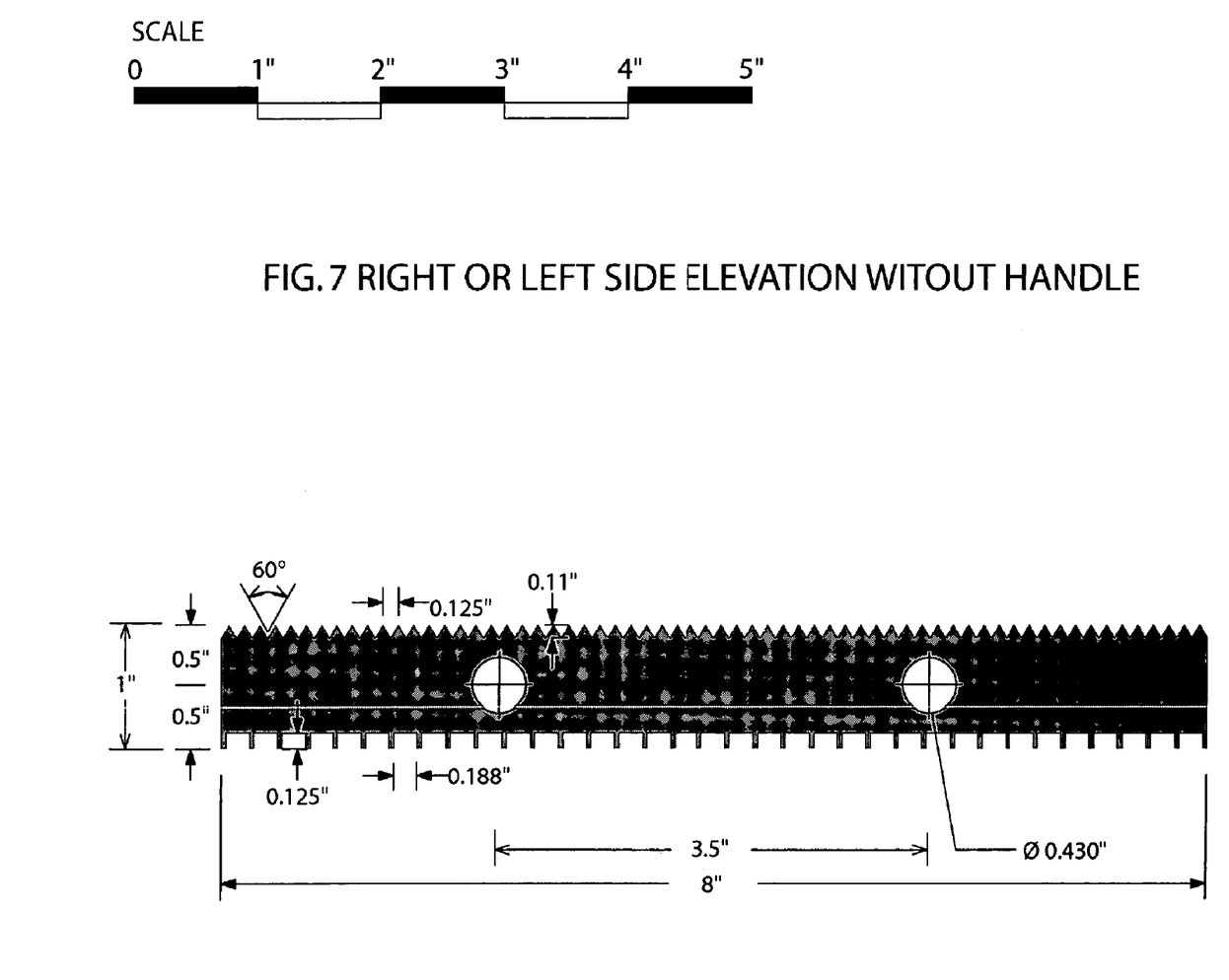
FIG. 7 is the right side elevation without the handle
Figure 8:
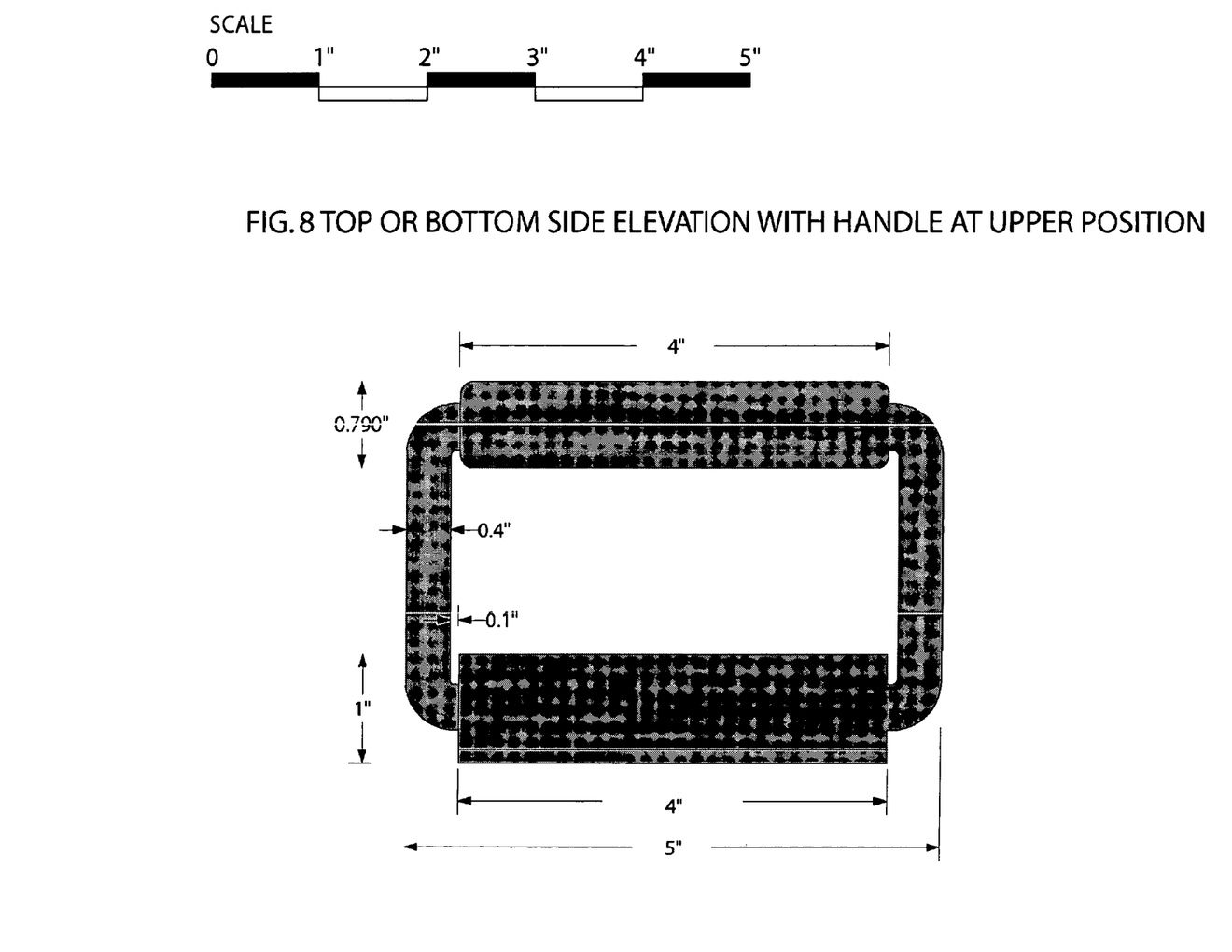
FIG. 8 is the top or the bottom side elevation with handle at upper position of the present invention
Figure 9:
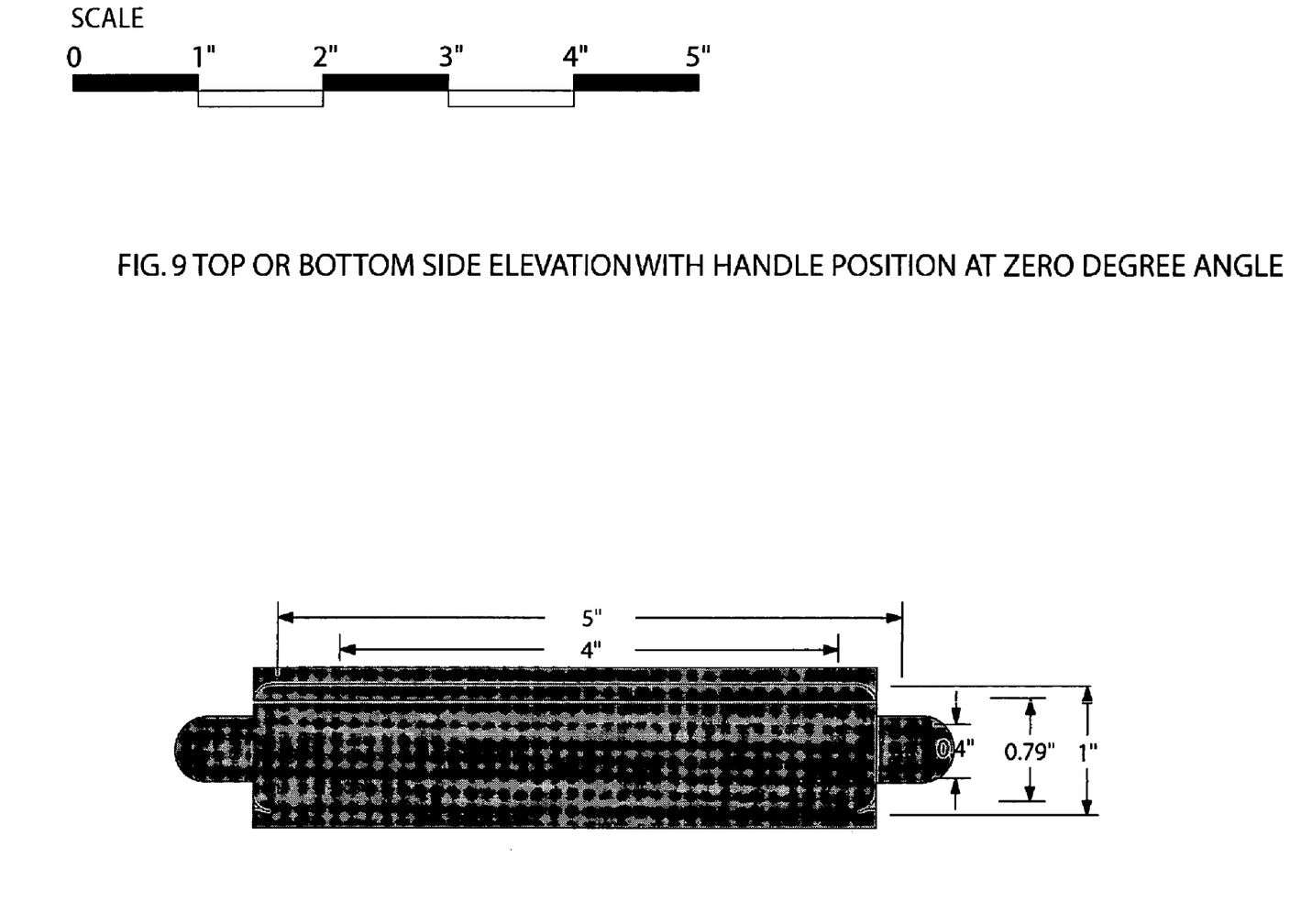
FIG. 9 is the top or bottom side elevation with handle at zero degree angle position

Gnocchi Maestro is built of polypropylene material, steel, fiberglass, glass, or wood; The "paddle" is 8 inches long, 4 inches wide and 1 inch thick. The left and right sides are 8 inches long, 4 inches wide and contain two 0.4 inch-diameter holes; The top and bottom sides are 4 inches long and 1 inch wide. The front contains 63 V-shaped grooves 0.125 inches wide, 0.11 inches deep, and angles in at 60 degrees. The back contains 35 U-shaped grooves 0.188 inches wide and 0.125 inches deep.

The handles are of a "C" shape, 3.3 inches long each with rounded corners. The short side of each is 0.4 inches in diameter and 3.3 inches long. The long side is 0.4 inches in diameter and 5 inches long covered with a plastic cylinder 4 inches long and varies in thickness.

What is claimed is:

1. A tool for shaping pasta dough comprising:

A monolithic slab, of a rectangular shape, having a first surface and second surface, wherein the first and the second surfaces are directly opposite one another; wherein the first surface has V-shaped grooves cut into the surface, such that the grooves cover substantially the entire surface and wherein the second surface has U-shaped grooves cut into the surface, such that the grooves cover substantially the entire surface; wherein the grooves contact the pasta dough to impart a pattern onto the surface of the pasta dough;

And a handle, wherein the handle is comprised of two rods, wherein the rods are configured into two equal, rectangular shapes, wherein such rods are attached to the monolithic slab through two holes; wherein the holes are drilled through a third and fourth surface, respectively of the slab, such third and fourth surfaces, directly opposite one another, and such third and fourth surfaces, are both perpendicular to the first and second surfaces; wherein the holes pass completely through the interior of the slab without touching the first and second surfaces and wherein such holes are disposed at an equal distance from each other and such holes form two cylindrical tubes through the interior of the slab; wherein the first rod is attached to the slab through the first hole such that one of the longest sections of the rectangularly-shaped rod lies within the cylindrical tube formed by the first hole and wherein the second rod is attached to the slab through the second hole such that one of the longest sections of the rectangularly-shaped rod lies within the cylindrical tube formed the second hole; wherein the two rods are pivotable about the slab through the first and second holes from a first position in which the rods are disposed in a vertical plane, perpendicular to the slab, and opposite the first surface, to a second position in which the rods lie horizontally and in line with the slab, such that the rods and the slab lie in the same horizontal plane, to a third position in which the rods are disposed, again, in a vertical plane, perpendicular to the slab, yet opposite the second surface; wherein the rods have exposed portions not lying within the cylindrical tubes formed by both the first and second holes which are covered by an anti-slip material.

* * * * *